United States Patent
Somasundaram et al.

(10) Patent No.: US 8,135,435 B2
(45) Date of Patent: Mar. 13, 2012

(54) SYSTEM INFORMATION UPDATES IN LTE

(75) Inventors: Shankar Somasundaram, Deer Park, NY (US); Kalpendu R. Pasad, Hicksville, NY (US); Jin Wang, Central Islip, NY (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 562 days.

(21) Appl. No.: 12/259,409

(22) Filed: Oct. 28, 2008

(65) Prior Publication Data
US 2009/0124245 A1    May 14, 2009

Related U.S. Application Data

(60) Provisional application No. 60/983,511, filed on Oct. 29, 2007.

(51) Int. Cl.
*H04M 1/00* (2006.01)
(52) U.S. Cl. .... 455/552.1; 455/73; 455/450; 455/452.2; 370/329; 370/341; 370/468
(58) Field of Classification Search .......... None
See application file for complete search history.

(56) References Cited

U.S. PATENT DOCUMENTS

| | | | |
|---|---|---|---|
| 7,299,065 B2 | 11/2007 | Choi et al. | |
| 2005/0288040 A1* | 12/2005 | Charpentier et al. | 455/458 |
| 2006/0019641 A1* | 1/2006 | Vayanos et al. | 455/414.1 |
| 2006/0030342 A1* | 2/2006 | Hwang et al. | 455/466 |
| 2008/0205322 A1* | 8/2008 | Cai et al. | 370/312 |
| 2008/0318566 A1* | 12/2008 | Chun et al. | 455/422.1 |
| 2009/0207774 A1* | 8/2009 | Lee et al. | 370/312 |
| 2009/0303910 A1* | 12/2009 | Sun et al. | 370/312 |
| 2010/0151869 A1* | 6/2010 | Fischer et al. | 455/450 |
| 2010/0165901 A1* | 7/2010 | Kim | 370/312 |
| 2010/0272037 A1* | 10/2010 | Lee et al. | 370/329 |

FOREIGN PATENT DOCUMENTS

| | | |
|---|---|---|
| EP | 2 007 087 | 12/2008 |
| JP | 2003-115796 | 4/2003 |
| JP | 2007-522776 | 8/2007 |
| WO | WO 2005/079105 | 8/2005 |
| WO | 2005/117297 | 12/2005 |
| WO | 2008/050958 | 5/2008 |

OTHER PUBLICATIONS

Nokia Corporation et al., "System Information Scheduling—Clarifications," 3GPP TSG-RAN WG2 Meeting #60bis, R2-080156 (Jan. 14-18, 2008).
Third Generation Partnership Project, "Technical Specification Group Radio Access Netowork; Evolved Universal Terrestrial Radi Access (E-UTRA) Radio Resource Control (RRC); Protocol Specification (Release 8)", 3GPP TS 36.331. V8.2.0, (May 2008).
Third Generation Partnership Project, "Technical Specification Group Radio Access Netowork; Evolved Universal Terrestrial Radi Access (E-UTRA) Radio Resource Control (RRC); Protocol Specification (Release 8)", 3GPP TS 36.331. V8.3.0, (Sep. 2008).

* cited by examiner

*Primary Examiner* — Ajit Patel
(74) *Attorney, Agent, or Firm* — Condo Roccia LLP

(57) ABSTRACT

A method and apparatus for receiving system information updates includes a wireless transmit receive unit (WTRU) receiving a system frame number. The WTRU also receives system information messages in a modification period. The modification period has a boundary determined by the system frame number. The WTRU receives system information change notification after a first modification change boundary and determines that the system information is valid until a second modification change boundary.

14 Claims, 2 Drawing Sheets

SYSTEM INFORMATION UPDATES IN LTE

CROSS REFERENCE TO RELATED APPLICATION

This application claims the benefit of U.S. provisional application No. 60/983,511, filed Oct. 29, 2007 which is incorporated by reference as if fully set forth.

FIELD OF INVENTION

The present invention is related to wireless communication systems.

BACKGROUND

The Third Generation Partnership Project (3GPP) has initiated the Long Term Evolution (LTE) program to bring new technology, new network architecture, new configurations and new applications and services to wireless networks in order to provide improved spectral efficiency and faster user experiences. In an LTE compliant network, a wireless transmit receive unit (WTRU) may receive system information updates. Included in the system information updates may be the size and location of a Physical HARQ Indicator Channel (PHICH).

A WTRU may receive updated system information on a Primary Broadcast Channel (P-BCH) or Dynamic-BCH (D-BCH). Resource allocation for system information updates may be fixed or variable, but variable resource allocation is preferred for signaling efficiency.

Variable resource allocation, however, suffers from a disadvantage. A WTRU may experience excessive latency when waking from Discontinuous Reception (DRX) cycle and excessive overhead may be required to signal system update information. A WTRU may need to wait as long as 80 ms before it receives an entire D-BCH message. Latency becomes an issue if the eNodeB (eNB) is permitted to change system information every D-BCH cycle.

If a WTRU wakes up from DRX exactly at the D-BCH boundary, it has to wait at least 80 ms for D-BCH to be completely received before it can decode and retrieve the system information update. During this interval, the WTRU does not know if the system information has changed since its last uplink (UL) transmission. If the WTRU wakes up in the middle of the D-BCH cycle, then it cannot decode the D-BCH in its current cycle. The result may be as much as a 150 ms delay, which is not acceptable for time sensitive applications such as voice over Internet protocol (VoIP). Similar latency is experienced when system information updates are transmitted on the P-BCH, with a potential latency of 70 ms.

Therefore, there exists a need for an improved method and apparatus for signaling system information updates.

SUMMARY

A method and apparatus for receiving system information updates may include a wireless transmit receive unit (WTRU) receiving a system frame number. The WTRU may also receive system information messages in a modification period. The modification period has a boundary determined by the system frame number. The WTRU may receive a system information change notification after a first modification change boundary and determine that the system information is valid until a second modification change boundary.

DETAILED DESCRIPTION

Figure 1:
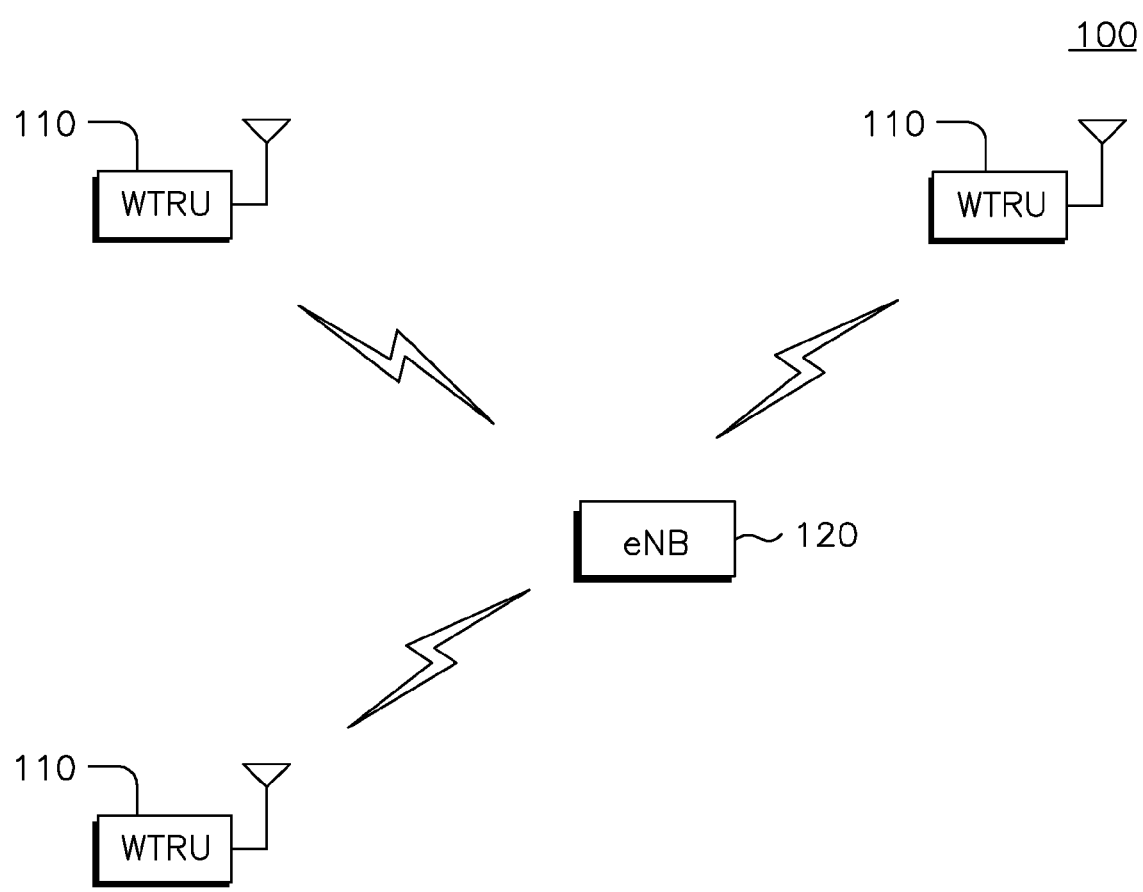
FIG. 1 shows an example wireless communication system including a plurality of WTRUs and an eNB in accordance with one embodiment.

When referred to hereafter, the terminology "wireless transmit/receive unit (WTRU)" includes but is not limited to a user equipment (UE), a mobile station, a fixed or mobile subscriber unit, a pager, a cellular telephone, a personal digital assistant (PDA), a computer, or any other type of user device capable of operating in a wireless environment. When referred to hereafter, the terminology "base station" includes but is not limited to a Node-B, a site controller, an access point (AP), or any other type of interfacing device capable of operating in a wireless environment.

System information, such as a location and size of a downlink Physical HARQ Indicator Channel (PHICH), may be transmitted between an eNB and a WTRU. If the WTRU is waking from the Discontinuous Reception (DRX) cycle and waiting for the Dynamic Broadcast Channel (D-BCH) or Primary-BCH (P-BCH), unwanted latency may be incurred.

System information updates may occur at specific radio frames. A system information message may be transmitted more than once during a single modification period. The information in the message may be repeated.

A WTRU may obtain a system frame number (SFN) during initial access. In order to recognize a modification period boundary, the WTRU may determine the boundary by calculating mod(SFN, n), where n is an integer value configured by system information, signaled to the WTRU or calculated by the WTRU using a predefined formula. Alternatively, the WTRU may determine the boundary by calculating mode (SFN, n×A), where "A" may correspond to the length of the P-BCH or D-BCH expressed in 10 ms radio frames. For example, if the length is 40 ms, the value of A is 4.

When the network changes system information, it first may notify a WTRU about the change. The notification may be done throughout a first modification period. In a second modification period, the network may transmit the updated system information. The second modification period may follow directly after the first modification period. Upon receiving a change notification, the WTRU may determine that the current system information is valid until the next modification period boundary.

A Paging message may be used to inform a WTRU in Idle mode or connected mode about a system information change. If a WTRU receives a paging message that includes a system information modification message, the WTRU may determine that the system information may change at the next modification boundary. The Paging message is a radio resource control (RRC) message and may have a paging cycle similar to the paging cycle already in use by the WTRU. Alternatively, the paging cycle may be different than the paging cycle in use by the WTRU.

More specifically, the system information, for example, the PHICH configuration, may be signaled on the D-BCH. If the D-BCH is transmitted over 80 ms (defined as a D-BCH cycle), a WTRU may listen to the D-BCH at n×80 ms intervals for a prospective update of system information, including, for example, the PHICH configuration. If a WTRU wakes up in the middle of the n×80 ms cycle, it is not required to check the D-BCH for system information since the system information, such as PHICH configuration, for example, is static during this interval. This may result in a reduction in latency as the WTRU can begin uplink (UL) communication without having to wait for a D-BCH cycle to complete.

Similarly, if the system information change is transmitted on the P-BCH, a configuration update can be signaled every n×40 ms, where 40 ms is the P-BCH transmission time. A WTRU may read the P-BCH every mod(SFN, n×4), where 4 corresponds to the length of D-BCH cycle in number of 10 ms radio frames. A WTRU can join the network at any time between the system information update cycle, that is, anytime in the n×40 ms interval FIG. 1 shows a wireless communication system 100 including a plurality of WTRUs 110 and an e Node B (eNB) 120. As shown in FIG. 1, the WTRUs 110 are in communication with the eNB 120. Although three WTRUs 110 and one eNB 120 are shown in FIG. 1, it should be noted that any combination of wireless and wired devices may be included in the wireless communication system 100.

Figure 2:
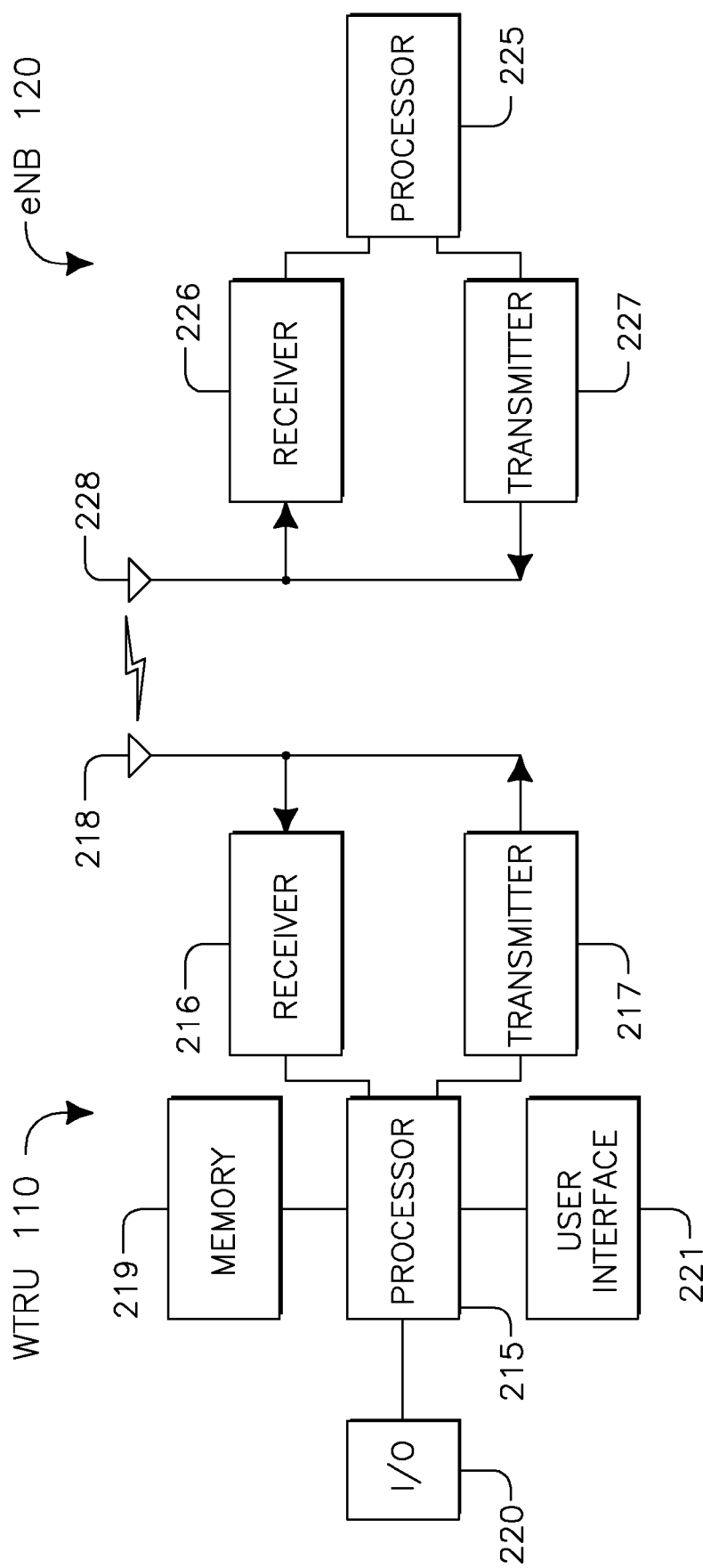
FIG. 2 is a functional block diagram of a WTRU and the eNB of FIG. 2.

FIG. 2 is a functional block diagram 200 of a WTRU 110 and the base station 120 of the wireless communication system 100 of FIG. 1. As shown in FIG. 1, the WTRU 110 is in communication with the eNB 120. The WTRU 110 is configured to receive system information and system information updates from the eNB 120. The eNB 120 may be configured to transmit, and the WTRU 110 configured to receive, signals on the P-BCH and the D-BCH. The WTRU 110 may also be configured to operate in a DRX mode and/or a DTX mode. The WTRU 110 may be configured to receive paging messages and other RRC messages. The WTRU 110 may determine the boundaries of the system information modification based on the SFN.

In addition to the components that may be found in a typical WTRU, the WTRU 110 includes a processor 215, a receiver 216, a transmitter 217, and an antenna 218. The WTRU 110 may also include a user interface 221, which may include, but is not limited to, an LCD or LED screen, a touch screen, a keyboard, a stylus, or any other typical input/output device. The WTRU 110 may also include memory 219, both volatile and non-volatile as well as interfaces 220 to other WTRU's, such as USB ports, serial ports and the like. The receiver 216 and the transmitter 217 are in communication with the processor 215. The antenna 218 is in communication with both the receiver 216 and the transmitter 217 to facilitate the transmission and reception of wireless data.

In addition to the components that may be found in a typical eNB, the eNB 120 includes a processor 225, a receiver 226, a transmitter 227, and an antenna 228. The receiver 226 and the transmitter 227 are in communication with the processor 225. The antenna 228 is in communication with both the receiver 226 and the transmitter 227 to facilitate the transmission and reception of wireless data.

The number of possible resource allocation sizes for system information may be reduced to a subset of the maximum number of possibilities. If the size of the system information resource allocation, such as for PHICH, can be only one of m different values, where m is a positive integer, then $\log_2(m)$ bits are required to signal the m sizes. The value of m may be fixed by the network, or an eNB may optimize control channel availability by using a different value of m under different load conditions. For example, if the load is high, the eNB may benefit from a finer granularity of the resource assignments and, therefore, select a larger value of m. If the load is low and some waste in system information resources can be tolerated, then the eNB can use a smaller value of m.

The eNB may further be restricted to changing system information resource allocation by a particular delta. As an example, using 2 bits, an eNB may transmit the messages shown in Table 1.

TABLE 1

Message mapping to two (2) bit signal

| Number of bits to signal delta in system information size | Increase/Decrease in system information size |
|---|---|
| 00 | No change since previous allocation |
| 01 | Increase allocation by $k_I$ resources |
| 10 | Decrease allocation by $k_D$ resource |
| 11 | Unused or use it for increase/decrease by other number of resources. |

In Table 1, $k_I$ is the delta by which the number of resources can be increased and $k_D$ is the delta by which the number of resources can be reduced. $k_I$ and $k_D$ can be equal or different. The value of m, $k_I$ and $k_D$ can be signaled to the WTRU at initial access or may be fixed and made static over the entire network. As shown in Table 1, if the WTRU receives "00", the WTRU may determine that the new resource allocation is the same as the previous resource allocation. A "01" received by the WTRU indicates that the resources allocation is increased by $k_I$. A "10" received by the WTRU indicates that the allocation is decreased by $k_D$. It should be understood that in an alternative embodiment, the eNB may use more than 2 bits or have more levels of granularity to signal to the WTRU.

A parameter Δn may be defined as a number of D-BCH cycles before the WTRU aligns with the next system information update. After Δn×80 ms, the WTRU may align with the system information update cycle. Following the alignment, the WTRU reads the D-BCH for updates every n×80 ms interval. An may be WTRU specific and can be signaled on the random access channel (RACH) response.

If system information resource assignments change only in a semi-static manner, the D-BCH overhead can be reduced by not transmitting the system information parameters until their scheduled reporting cycle. Two D-BCH formats may be used. A first format includes the system information resource signaling that occurs every n×80 ms. A second format may be shorter than the first format and not include system information. A WTRU that misses reading the D-BCH or P-BCH during a system information update, due to, for example, a late wake up, may use the D-BCH or P-BCH format to recognize a D-BCH carrying system information.

An eNB may have some flexibility in changing the value of n. If an eNB decides to change n, the eNB may issue a page to a WTRU. In response to the page, the WTRU may read the P-BCH channel at the beginning for following the P-BCH cycle. In the following cycle, the P-BCH carries System Information Blocks (SIBS) that carry the value of n. As n can be any number of bits, the update cycle is $2^n \times 80$ msec.

Although the features and elements are described in particular combinations, each feature or element can be used alone without the other features and elements or in various combinations with or without other features and elements. The methods or flow charts provided may be implemented in a computer program, software, or firmware tangibly embodied in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) module.

What is claimed is:

1. A method for a wireless transmit receive unit (WTRU) to receive a system information update, the method comprising:
   receiving a system information update notification in a first modification period;
   receiving a system information update in a second modification period;
   obtaining a system frame number, SFN, and an integer value "n"; and
   determining, based on the SFN and the integer value, a system information modification period boundary that is between the first modification period and the second modification period.

2. The method of claim 1, further comprising maintaining current system information as valid until the second modification period.

3. The method of claim 1, further comprising determining the system information modification period boundary based on an equation mod(SFN, n).

4. The method of claim 1, wherein the integer value is configured by system information.

5. The method of claim 1, further comprising calculating the integer value based on a predefined formula.

6. The method of claim 1, further comprising receiving a paging message including a system information modification message.

7. The method of claim 1, further comprising receiving a radio resource control (RRC) message including a system information modification message.

8. A wireless transmit receive unit (WTRU) comprising:
   a receiver configured to receive first system information update notification in a first modification period and a second system information update notification in a second modification period; and
   a processor configured to obtain a system frame number (SFN) and an interger value "n", and to determine, based on the system frame number and the integer value, a system information modification period boundary that is between the first modification period and the second modification period.

9. The WTRU of claim 8, wherein the processor is further configured to maintain current system information as valid until the second modification period.

10. The WTRU of claim 8, wherein the system information modification period boundary is determined based on an equation mod(SFN, n).

11. The WTRU of claim 8, wherein the integer value has been configured by system information.

12. The WTRU of claim 8, wherein the integer value is calculated based on a predefined formula.

13. The WTRU of claim 8, wherein the receiver is configured to receive a paging message including a system information modification message.

14. The WTRU of claim 8, wherein the receiver is configured to receive a radio resource control, RRC, message including a system information modification message.

* * * * *